(12) United States Patent
Jeong (10) Patent No.: US 8,099,421 B2
(45) Date of Patent: Jan. 17, 2012

(54) FILE SYSTEM, AND METHOD FOR STORING AND SEARCHING FOR FILE BY THE SAME

(75) Inventor: Soon-Yong Jeong, Suwon-si (KR)

(73) Assignee: Samsung Electronics Co., Ltd (KR)

(*) Notice: Subject to any disclaimer, the term of this patent is extended or adjusted under 35 U.S.C. 154(b) by 980 days.

(21) Appl. No.: 11/962,974

(22) Filed: Dec. 21, 2007

(65) Prior Publication Data

US 2008/0155171 A1    Jun. 26, 2008

(30) Foreign Application Priority Data

Dec. 26, 2006 (KR) .................. 10-2006-0134231

(51) Int. Cl.
*G06F 7/00* (2006.01)
(52) U.S. Cl. ......... 707/758; 707/755; 707/828; 711/100
(58) Field of Classification Search .................. 707/755, 707/758, 828; 711/100
See application file for complete search history.

(56) References Cited

U.S. PATENT DOCUMENTS 5,701,463 A * 12/1997 Malcolm ................ 707/758
5,754,844 A *  5/1998 Fuller ........................ 1/1

FOREIGN PATENT DOCUMENTS

| JP | 2006-164276 | 6/2006 |
| KR | 1020010039297 | 5/2001 |
| KR | 1020050097025 | 10/2005 |
| KR | 1020060062444 | 6/2006 |

* cited by examiner

*Primary Examiner* — Cheyne Ly
(74) *Attorney, Agent, or Firm* — The Farrell Law Firm, P.C.

(57) ABSTRACT

A file system and a method for file storage and file search by the same are provided. All files have unique names in a block-based storage device, such as a hard disk, a flash memory, etc., so that each file is mapped and stored in a one-dimensional storage area. Each file name is matched with a memory block storing data of the corresponding file so that a memory block corresponding to a file name can be found when the file name is input. In addition, through information stored in the found memory block, the data corresponding to the file name can be read from the memory block storing the data or can be stored in a specific memory block.

6 Claims, 7 Drawing Sheets

FILE SYSTEM, AND METHOD FOR STORING AND SEARCHING FOR FILE BY THE SAME

PRIORITY

This application claims priority under 35 U.S.C. §119(a) to a Korean Patent Application entitled "File System, And Method For Storing And Searching For File By The Same" filed with the Korean Intellectual Property Office on Dec. 26, 2006 and assigned Serial No. 2006-134231, the contents of which are incorporated herein by reference.

BACKGROUND OF THE INVENTION

1. Field of the Invention

The present invention relates to a file system, and more particularly to a file system that frequently performs a file search.

2. Description of the Related Art

In general, a file system manages directories and files in the form of a tree. According to such a tree-type file system, nodes of a root part corresponds to root directories, each node other than a leaf corresponds to a directory, and each leaf corresponds to a file or an empty directory. In such a file system, a file is searched for by separating a given route based on directory delimiters and then by matching the given route with corresponding nodes in a sequence from a route node. For example, when there is a route of "/A/B/C," the file system executes a file searching operation in such a manner that the file system separates nodes into nodes A, B and C, finds node A from among route nodes, finds node B from among nodes contained in node A when having found node A, and then finds node C from among nodes contained in node B when having found node B. When the file system fails in a search even once while performing the file searching operation, it is determined that the corresponding file is a nonexistent file.

A file searching procedure based on a File Allocation Table (FAT) file system, which is currently in general use, will now be described in more detail. According to the FAT file system, first, a root directory file must be read in order to find nodes contained in a root node. The root directory file represents a file that includes information about nodes included in a root directory and the attributes of the root directory. When a root directory file cannot all be stored in one FAT block (i.e., a cluster) because the root directory file is too large, it is necessary to read all blocks in which the root directory file has been stored. In this case, blocks storing the root directory file can be found by means of a look-up table (i.e., FAT table) of the FAT file system. The FAT table stores information about whether each block is in use, and a list of blocks when a file has been stored over the blocks.

When a directory file has been read, the FAT file system searches the read directory for a desired file. In this case, generally, since nodes and/or files (hereinafter, "entries") included in a directory are not arranged, a desired entry must be searched for in a linear searching scheme. When the desired entry has been searched for, data of the searched entry is read from a block storing the data corresponding to the searched entry. If the read entry's data corresponds to data of a different directory, it is necessary to again read a file of the corresponding directory. Therefore, until a given route has been found, a procedure of reading a directory file and finding the entry of a desired directory is repeatedly performed.

Once a desired file has been found, information about a data block storing data of the desired file can be understood, so that it is possible to perform a file processing operation such as a writing or reading. If a file is too large to be stored in one block, one or more different empty blocks can additionally be used. In this case, when a file pointer moving instruction, such as a reading, writing or searching, is issued, the file system moves a file point by means of the FAT table so as to find a next block, similar to when reading a directory file.

The recent file systems including New Technology File System (NTFS) and $3^{rd}$ EXTended file system (EXT3) further have various functions to solve such a FAT defect. For example, the recent file systems additionally provide a method of relieving the restriction of a file size, or a supplementary structure to rapidly search for a directory entry. However, since even such recent file systems have structures similar to that of the aforementioned FAT file system, the recent file systems also perform a file searching operation in a manner similar to that of the FAT file system. That is, the recent files systems also are configured in the form of a tree in which a root directory, a plurality of directories and a plurality of files included in each directory are arranged.

Generally, a file system is implemented in a block device having a block-type memory structure, such as a hard disk or flash memory. Therefore, in this case, in order to search for a desired file, a block reading operation with respect to one or more directory files must be performed as many times as the number of directory nodes included in a file route. Generally, it takes a long time to read a specific memory block in a storage device, such as a hard disk or flash memory. Particularly, in the case of the hard disk, if blocks therein are discontinuous, it takes a very long time to access each block, thereby taking a longer time to read the blocks in the hard disk than in the flash memory. As described above, conventional file systems have a problem in that they take a long time to search for a desired file.

SUMMARY OF THE INVENTION

Accordingly, the present invention has been made to solve the above-mentioned problems occurring in the prior art, and the present invention provides a file system and a method for file storage and file search by the same, which can reduce the time required for a file search, thereby achieving efficient file storage and file search.

In accordance with an aspect of the present invention, there is provided a file system for storing a file, the file system including a conversion unit for creating a name of a file to be stored and converting a created file name into memory block information about a specific memory block; a storage unit including a plurality of memory blocks, which contains a memory block corresponding to the memory block information converted from the file name, and one or more memory blocks to store data corresponding to the file name; and a data management unit for selecting the memory block corresponding to the memory block information and the one or more memory blocks to store the data, storing detailed information about the file and information about the one or more memory blocks selected to store the data in the memory block corresponding to the memory block information, and storing the data corresponding to file name in the one or more memory blocks selected to store the data.

In accordance with another aspect of the present invention, there is provided a file system for searching for a file, the file system including a conversion unit for converting a name of a target file into memory block information about a specific memory block; a storage unit including a plurality of memory blocks, which contains a memory block corresponding to the memory block information, and one or more memory blocks storing data corresponding to the target file; a data management unit for selecting the memory block corresponding to the memory block information, and when the selected memory block has stored detailed information about the target file and memory block information about the one or more memory blocks having stored the data corresponding to the target file, reading the data corresponding to the target file from the one or more memory blocks having stored the data; and an output unit for outputting the read data.

In accordance with still another aspect of the present invention, there is provided a method for storing a newly-created file in a file system, the method including a name creation step of creating a name of the created file; a conversion step of converting the name of the file into information about a specific memory block; a selection step of selecting a memory block corresponding to the converted memory block information and checking if the selected memory block is available; a data block number calculation step of calculating a number of memory blocks required to store data corresponding to the file name when the selected memory block is available; a data block selection step of selecting as many currently-available memory blocks as the number of memory blocks obtained through the calculation as data blocks; an information storage step of storing detailed information about the file and memory block information about the currently-selected data blocks in the selected memory block; and a data storage step of storing the data of the file in the memory blocks selected as the data blocks.

In accordance with still another aspect of the present invention, there is provided a method for searching for a target file in a file system, the method including a conversion step of, when a name of a target file is input, converting the input file name into memory block information about a specific memory block; a memory block selection step of selecting a memory block corresponding to the memory block information obtained through the conversion; a file block determination step of determining if the selected memory block has stored detailed information about a specific file and information about data blocks corresponding to the specific file; a name extraction step of extracting a name of the specific file from the selected memory block when the selected memory block has stored detailed information about a specific file and information about data blocks corresponding to the specific file; a comparison step of comparing the extracted file name with the name of the target file; a data block information extraction step of extracting information about the data blocks from the selected memory block when it is determined that the extracted file name is the same as the name of the target file as a result of the comparison; and a data read step of reading data corresponding to the target file from memory blocks corresponding to the extracted data block information.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EXEMPLARY EMBODIMENTS

Hereinafter, one exemplary embodiment of the present invention will be described with reference to the accompanying drawings. It is to be noted that the same elements are indicated with the same reference numerals throughout the drawings. In the following description, a detailed description of known functions and configurations incorporated herein will be omitted when it may obscure the subject matter of the present invention.

First, for a better understanding of the present invention, the basic concept of the present invention will be briefly described. According to the present invention, all files have unique names in a block-based storage device, such as a hard disk, a flash memory, etc., so that each file is mapped and stored in a one-dimensional storage area. Also, each file name is matched with a memory block storing data of the corresponding file so that a memory block corresponding to a file name can be found when the file name is input. In addition, through information stored in the found memory block, the data corresponding to the file name can be read from the memory block storing the data or can be stored in a specific memory block.

Figure 1:
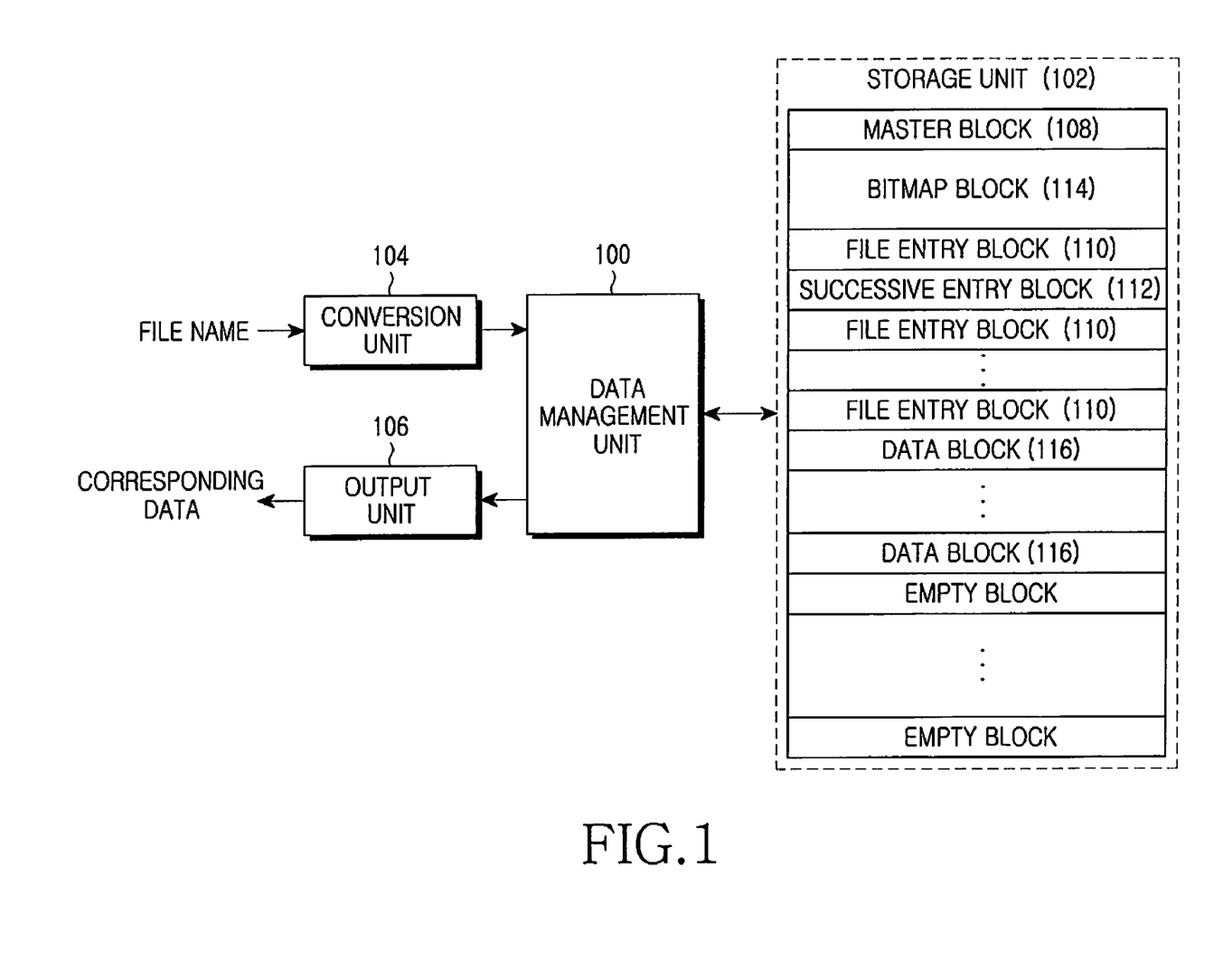
FIG. 1 is a block diagram illustrating the configuration of a file system according to an embodiment of the present invention.

FIG. 1 is a block diagram illustrating the configuration of a file system according to an embodiment of the present invention.

The file system includes a conversion unit 104, a storage unit 102, a data management unit 100 and output unit 106. The conversion unit 104 converts an input file name into information about a specific memory block upon a file search, and creates and converts a new file name into information about a specific memory block upon new file storage. The storage unit 102 includes a plurality of memory blocks, which contains a memory block corresponding to the memory block information into which the file name is converted, and a memory block for storing data corresponding to the file. When the file name has been converted into specific memory block information, the data management unit 100 reads data stored in a memory block corresponding to memory block information or stores data corresponding to the file name in a specified memory block. The output unit 106 outputs data when the data is read by the data management unit 100.

As described above, the conversion unit 104 converts a created or input file name into information about a specific memory block. When a file name has been input or created, the conversion unit 104 converts the file name into information about one of memory blocks in a preset area of the storage unit 102. To this end, the conversion unit 104 may use a function such as a hash function suitable for generating a fixed-length pseudo-random code from a given original text. When the conversion unit 104 converts a file name into memory block information by using the hash function, a preset area of the storage unit 102 may become a huge hash table. Herein, the memory block information refers to a value of information about a specific memory block, into which the file name is converted, that is, a function value obtained when the conversion unit 104 converts the file name into a specific function. Such a value is stored in an area (e.g., an area allocated with about 4 bytes) which is classified as a header within the storage area of each memory block.

The data management unit 100 selects a corresponding memory block from among memory blocks of the storage unit 102, by using memory block information converted from the file name. When a currently-set task is to create a new file, the data management unit 100 checks if it is possible to use a currently-selected memory block, and calculates the number of memory blocks (i.e., data blocks) to be used for storing data corresponding to the file to be newly created when it is possible to use the currently-selected memory block. Next, the data management unit 100 selects as many memory blocks as the calculated number from among the currently-available memory blocks. Then, the data management unit 100 stores information about currently-selected memory blocks (i.e., data blocks) and file entry information including the newly-created file name in a memory block corresponding to the file name. Herein, a memory block storing the file entry information becomes a file entry block.

Meanwhile, a memory block corresponding to memory block information converted from the file name may be an unavailable memory block. This is because, as described above, the file system according to an embodiment of the present invention converts a file name into memory block information by means of a specific function, selects one or more different memory blocks as data blocks, and stores data corresponding to the file name in the selected memory blocks.

Therefore, for example, either a memory block which has been selected as a data block and has already stored certain data therein or a memory block which has stored file entry information may be selected as a memory block corresponding to the memory block information converted from the file name. In this case, the file system according to an embodiment of the present invention additionally selects another currently-available memory block to store data corresponding to the newly-created file, and stores information about the additionally-selected block in the memory block corresponding to the file name, so that file entry information of the file to be created can be stored in another memory block, i.e., in the additionally-selected memory block.

Also, it should be clearly understood that file entry information may be stored in one or more memory blocks. For example, when a large sized file is stored, the number of data blocks to store data of the file increases so that one memory block may be insufficient to store all file entry information. Therefore, in this case, according to the present invention, the data management unit 100 additionally selects another available memory block, and stores file entry information in the currently-selected memory blocks. Then, the data management unit 100 records, in the currently-selected memory block, the fact that one file entry block has been stored, and stores information about the memory block corresponding to the file name and information about the additionally-selected memory block in the respective counterpart memory blocks so as to set a pointer between the memory blocks. Hereinafter, a memory block additionally selected as described above will be referred to as a "successive entry block."

Meanwhile, when a currently-set task is to search for a pre-stored file, the data management unit 100 converts an input file name into memory block information, and searches for a memory block corresponding to the converted memory block information. The memory block corresponding to the converted memory block information refers to a file entry block, as described above. Therefore, the data management unit 100 reads file entry information from the searched memory block, and extracts information about data blocks, which is included in the file entry block. Then, the data management unit 100 reads data from the extracted data blocks and outputs the read data to the output unit 106.

Upon such a file search task, it may be determined that file entry information corresponding to a file name may not have been stored in a memory block corresponding to the file name. This is because, similar to the aforementioned file storage task, the file system according to the present invention converts a file name into memory block information by means of a specific function, selects another memory block as a data block, and then stores data corresponding to the file name in the another memory block. Accordingly, a memory block having already stored different data or different file's entry information may be selected as a memory block corresponding to memory block information converted from the file name.

In this case, as described above in relation to a file storage task, the file system according to the present invention selects another memory block and stores information about the selected memory block in the memory block corresponding to the file name. Therefore, when data other than data corresponding to the file name is stored in the memory block corresponding to the file name, the data management unit 100 searches for a file entry block corresponding to the file name by means of the stored information. In this case, whether data other than data corresponding to the file name has been stored can be determined depending on whether a corresponding memory block is a data block, and on whether a file name stored in file entry information is identical to a currently-input file name when the corresponding memory block is not a data block.

The storage unit 102 includes a plurality of memory blocks, which may be classified based on types of stored data, as shown in FIG. 1. For example, the memory blocks of the storage unit 102 may be classified into a master block 108, a bitmap block 114, a file entry block 110, a successive entry block 112 and a data block 116.

The master block 108 may store information for identifying the file system, such as a magic code and version information; various flags representing whether the master block 108 is stored over a plurality of memory blocks or for managing the storage unit 102; and information about the total number of memory blocks, the size of each memory block and the size of the header of each memory block. The detailed configuration of the master block 108 will be described later with reference FIG. 2.

The bitmap block 114 stores information about the state of each memory block included in the storage unit 102. The information about the state of each memory block may include information representing whether a corresponding memory block is currently in use, or information representing whether a corresponding memory block is currently available. Therefore, the data management unit 100 can recognize which block is currently available by scanning the bitmap block 114 when storing a new file. Also, the data management unit 100 can recognize whether a specific memory block corresponds to a block having stored file entry information or a block having stored data. Table 1 below shows an example in which 2-bit bitmap information for each memory block is used to express the state of the corresponding memory block.

TABLE 1

| | |
|---|---|
| 00 | Empty |
| | File or group entry has been stored. |

As shown in Table 1, the file system of the present invention can employ a bitmap information item with only two bits per memory block. Therefore, the bitmap block according to an embodiment of the present invention may be configured with a much smaller capacity than that of the bitmap block used in a conventional file system. The bitmap block 114 may be configured in a memory block other than the master block 108, as shown in FIG. 1, or may be incorporated with the master block 108 in one memory block. Also, similar to the conventional file system, the bitmap block 114 and master block 108 are located at the head of the file system, and cannot be utilized as a data block, a file entry block 110 or a successive entry block 112.

The file entry block 110 stores file entry information, as described above. The file entry information includes information about a name of a specific file, information about data blocks storing data of the specific file, and attribute information representing the size of the specific file or the like. In addition, the file entry block 110 stores information about whether there is a relevant successive entry block 112, memory block information about a relevant successive entry block 112 when there is the relevant successive entry block 112, a file entry header, etc. The successive entry block 112 is used to store a part of file entry information when the file entry information is too large to be stored in one memory block, as described above. Therefore, the successive entry block 112 stores memory block information about a relevant file entry block 110, and file entry information succeeding file entry information stored in the file entry block 110. The file entry block 110 also stores memory block information about a successive entry block 112 when the file entry block 110 has the successive entry block 112. The detailed configuration of the file entry block 110 and successive entry block 112 will be described later with reference to FIGS. 3A and 3B.

The data block 116 represents a memory block which has stored data corresponding to a specific file. The data block 116 may include a data block header and data. The header of the data block 116 may store information about whether there is a file sharing the same memory block information. That is, for example, the header of a data block may include not only its own index information but also index information of another file sharing the same memory block information. Therefore, upon creating a new file, if a memory block corresponding to a created file name has stored data of another file, the data management unit 100 newly selects an available memory block, and stores the memory block information about the newly-selected memory block in the memory block corresponding to the file name. Accordingly, when finding another file sharing the same memory block information with a desired file, the data management unit 100 can find a memory block having stored file entry information about the desired file from the header of the data block.

According to a file system based on the present invention, the file entry information includes information about a list of data blocks storing data of a relevant file. Therefore, when file entry information has been read, the data management unit 100 can find data blocks which have stored data of a relevant file, and can read a selected file from the storage unit 102 by directly accessing each found data block and reading stored data. Accordingly, the file system according to the present invention can reduce the time of reading directory files based on each directory delimiter, so that the file system does not need to have a layer structure, such as the form of a directory layer, thereby significantly reducing the time required for searching for a specific file.

Meanwhile, the file system of the present invention provides each file with a unique name. However, the users skilled in a directory-type file system may think it very troublesome to allocate a unique name to each file. In order to solve such an inconvenience, the file system according to the present invention classifies files into multiple groups by using the names of layers included in file names and delimiters for delimiting each layer when converting files of the conventional file system having a directory structure into files of the file system of the present invention.

For example, when there is a file named "A/B/C/D.txt," a file named "D.txt" is unique in the C directory, even in the conventional file system. However, the file named "D.txt" may simultaneously exist in the A directory and/or the B directory, as well as in the C directory. If file names are created with their delimiters, each file name will be a unique file name.

When it is assumed in relation to the aforementioned example that files having the same name of "D.txt" exist in the A, B and C directories, respectively, a D.txt file in the A directory may be converted into a file name of "A/D.txt," a D.txt file in the B directory may be converted into a file name of "A/B/D.txt," and a D.txt file in the C directory may be converted into a file name of "A/B/C/D.txt." In this case, the file system according to the present invention can give a unique file name to each of the D.txt files. Then, file names are separated based on the delimiters thereof, and groups are created according to the separated file names. Thus, the files can be grouped to belong to the respective created groups.

For example, when the files of "A/D.txt," "A/B/D.txt" and "A/B/C/D.txt" are separated based on the delimiters thereof and are classified into groups, an A group, a B group and a C group can be created. In this case, all the files are included the group name of "A" when being separated based on the delimiters thereof, so that all the files may be classified as the A group. Each of the A/B/D.txt file and A/B/C/D.txt file includes the group name of "B" in addition to the group name of "A" when being separated based on the delimiters thereof, so that the A/B/D.txt file and A/B/C/D.txt file may be classified as the B group. The A/B/C/D.txt file includes the group name of "C" in addition to the group names of "A" and "B" when being separated based on the delimiters thereof, so that the A/B/C/D.txt file may be classified as the C group. When the group names are separated by the delimiters, the A group may be created as the highest group, the B group as a lower group than the A group, and the C group as a lower group than the B group because the group names are located in the sequence of A group, B group and C group. The file system according to the present invention displays a structure of files, which have been grouped as described above, in the form of a tree, thereby enabling the user to easily search for a desired file. However, the file groups are just sheaves for management, and are not used to construct a route, unlike in the conventional directory concept. Such grouping may be performed by the data management unit 100.

Figure 2:
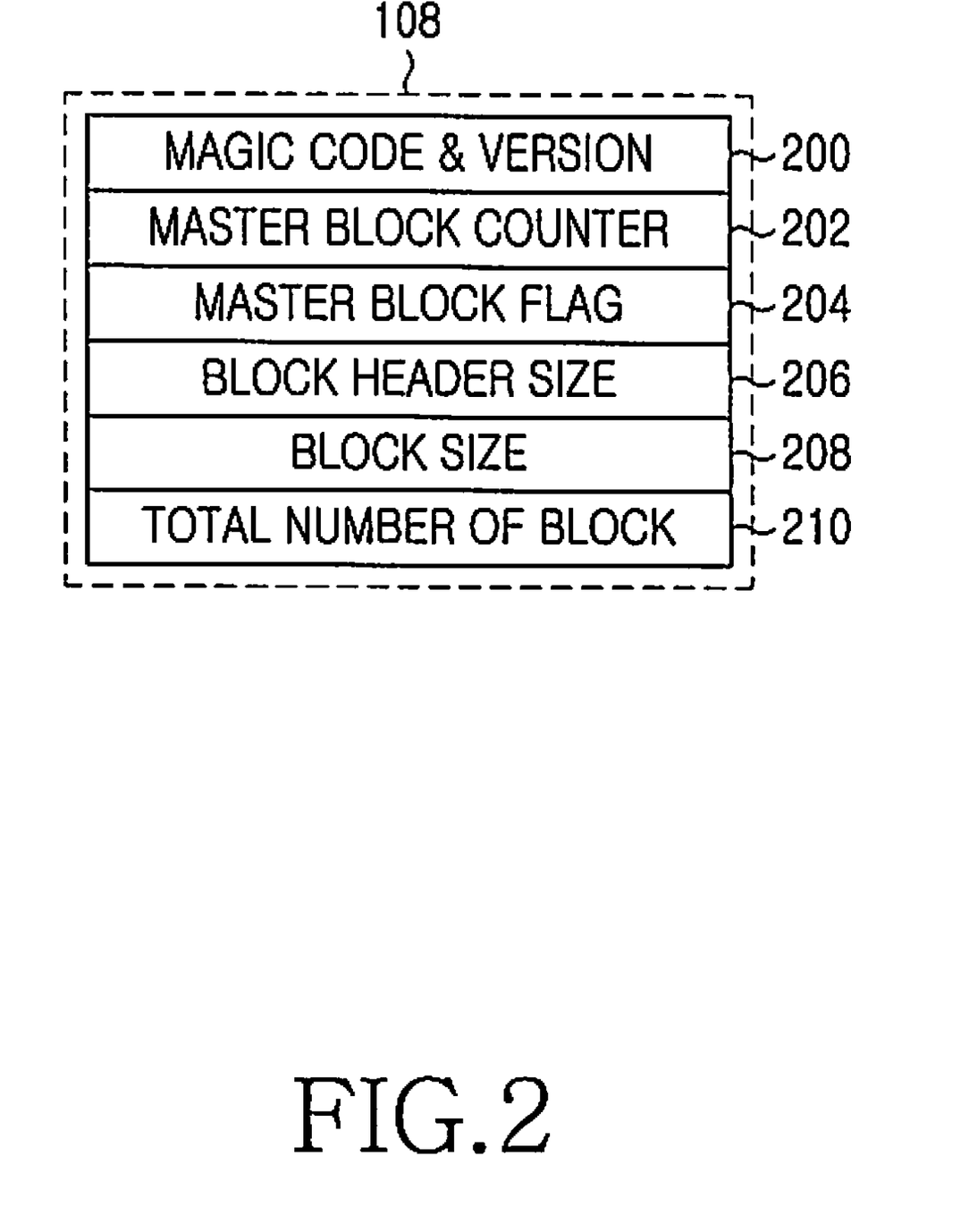
FIG. 2 illustrates the configuration of a master block in the file system according to an embodiment of the present invention.

FIG. 2 illustrates the configuration of a master block in the file system according to an embodiment of the present invention.

The master block 108 includes, as described above, a magic code and version area 200, a master block count area 202, a master block flag area 204, a block header size area 206, a block size area 208 and a total block number area 210.

The magic code and version area 200 stores information about a magic code and version for identifying the file system.

The master block count area 202 stores information about a plurality of memory blocks in which master block information has been stored, when the master block 108 is configured over the plurality of memory blocks. The master block flag area 204 stores information about various flags necessary for management of memory blocks. The master block flags may include a flag representing whether bitmap data is included in the same block. The block header size area 206 stores information about the block header size of each memory block. Generally, the block header size area 206 may be set to about 4 bytes. The block size area 208 stores information about the size of each memory block. The total block number area 210 stores information about the total number of memory blocks of the storage unit 102, which includes the master block 108.

Figure 3A:
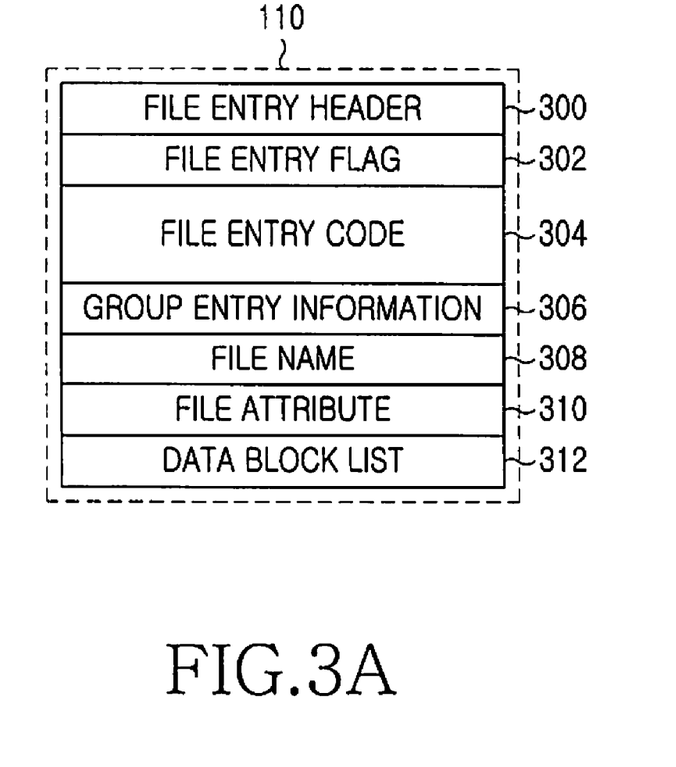
FIGS. 3A and 3B illustrates the configuration of the file entry block and successive entry block in the file system according to an embodiment of the present invention.
Figure 3B:
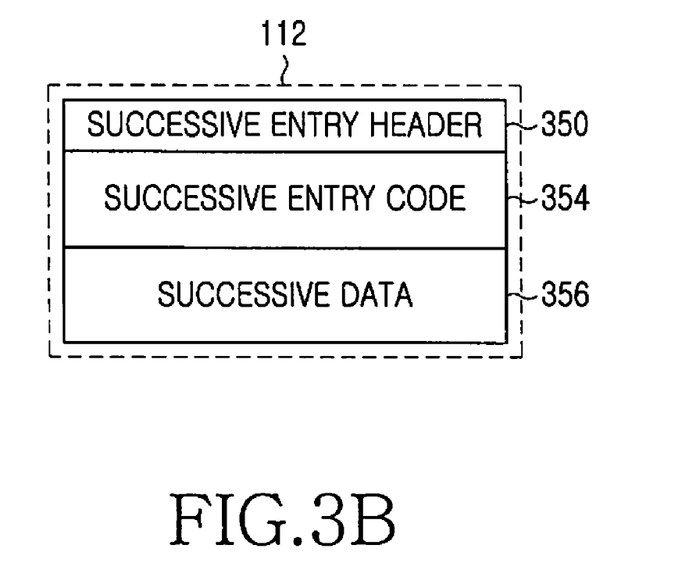

FIGS. 3A and 3B illustrates the configuration of the file entry block and successive entry block in the file system according to an embodiment of the present invention.

First, referring to FIG. 3A, the file entry block 110 includes a file entry header area 300, a file entry flag area 302, a file entry code area 304, a group entry information area 306, a file name area 308, a file attribute area 310 and a data block list area 312.

The file entry header area 300, which is an area for storing a file entry header, stores a function value (i.e., memory block information) converted from the file name by the conversion unit 104. The file entry flag area 302 stores various flag information about a corresponding file. Such flags may include, for example, a flag representing whether a relevant memory block corresponds to a file entry block, and a lock flag for preventing a corresponding file from being deleted. In addition, the flags may include a flag representing whether data of a corresponding file have been included in the file entry block. This is because it is preferred that data of the corresponding file be included in the file entry block 110 when the data is so small as to be all included within the file entry block 110. When a grouping function as described above is provided, data for representing grouped files may be stored as a file (hereinafter, "group entity") according to the request of the user. In this case, a flag representing that a file corresponds to a group entity may be stored in the file entry flag area 302.

The file entry code area 304 may additionally store information about a file entry block corresponding to another file. This is because the file entry block 110 may have a successive entry block (the former), as described above, and because different file names may share the same memory block address, even when a function, such as a hash function, used to convert a file name into information about a specific memory block, operates correctly (the latter).

In the case of the former, a successive entry block may be created when the file entry block 110 is created. This is because a successive entry block is created when the amount of file entry information stored in the file entry block 110 exceeds the capacity of one memory block. In this case, memory block information about the successive entry block is stored in the file entry code area 302 of the file entry block 110, and memory block information about the file entry block 110 is stored in the successive entry block, so that a doubly-linked list may be set between the two memory blocks.

Meanwhile, the latter cases may be caused when a file name corresponding to a memory block predetermined to be a specific file entry block 110 is input or created. In this case, according to the file system of the present invention, information about another memory block as well as the data block is additionally stored in the file entry code area 304 of the file entry block 110. Therefore, when a memory block corresponding to an input file name is being used as a file entry block, the file system selects another available memory block, and stores information about the selected memory block in the file entry code area 304 of the memory block being used as a file entry block. Then, the file system stores file entry information corresponding to the input file name in the selected memory block.

In this case, the memory block being used as the file entry block 110 for the another file and the memory block storing file entry information corresponding to the input file name also creates a doubly-linked list there between, similar to the case of the successive entry block. However, if the memory block being used as a file entry block 110 for another file has a successive entry block, the memory block storing file entry information corresponding to the input file name creates a doubly-linked list with the successive entry block.

Accordingly, according to the file system of the present invention, upon searching for a file, although different file names share the same memory block address, the file entry block corresponding to a target file can be found through a doubly-linked list created between memory blocks. In this case, the file system can determine if a current file entry block corresponds to a file entry block for a currently-input target file, by reading a file name from the current file entry block corresponding to memory block information converted from the target file name and then by comparing the read file name with the target file name.

The group entry information area 306 stores group information about a file corresponding to a current file entry block 110. In the file system according to an embodiment of the present invention, it is assumed that each file belongs to one or more groups. That is, each file is basically included in a virtual group named "NO GROUP," and also is included in one or more actual groups according to delimiters included in the file name. Therefore, even a file for which a specific group has not been specified comes to be included in at least one group. Thus, files according to the present invention can be viewed by the user in a form similar to the conventional file system having a directory structure.

The file name area 308 stores the name of a file corresponding to the file entry block 110. As described above, each file name is unique in all files and groups within the file system. This is because the file name is the very unique key to access the file entry block in the file system according to the present invention. The file attribute area 310 stores various information including a file size, a file attribute, etc. The data block list area 312 stores information about memory blocks in which data of a file corresponding to a relevant file entry block 110 has been stored. For example, the data block list area 312 may store the information about memory blocks in the form of arranging index information for the headers of the memory blocks. Also, the data block list area 312 may store information about the physical addresses of the memory blocks. If the file entry block 110 corresponds to a group entity, the data block list area 312 may store index information about a group or files included in the group.

FIG. 3B illustrates the configuration of the successive entry block 112. As described above, the successive entry block 112 is used to store a part of the file entry information (e.g., information contained in a file entry block, such as information regarding a file name, a file attribute, and a data block list), to be stored in the file entry block 110 when the file entry information is too large to be stored in one block. The successive entry block 112 may include a successive entry header area 350, a successive entry code area 354 and a successive data area 356.

The successive entry header area 350 stores the header of the successive entry block. The successive entry code area 354 stores information about the file entry block 110 from which the successive entry block 112 has received a part of file entry information, information about another successive entry block when there exists the another successive entry block, and information about a file entry block for another file sharing the same memory block information, thereby creating a doubly-linked list. The successive data area 356 stores a part of the divided file entry information.

Figure 4:
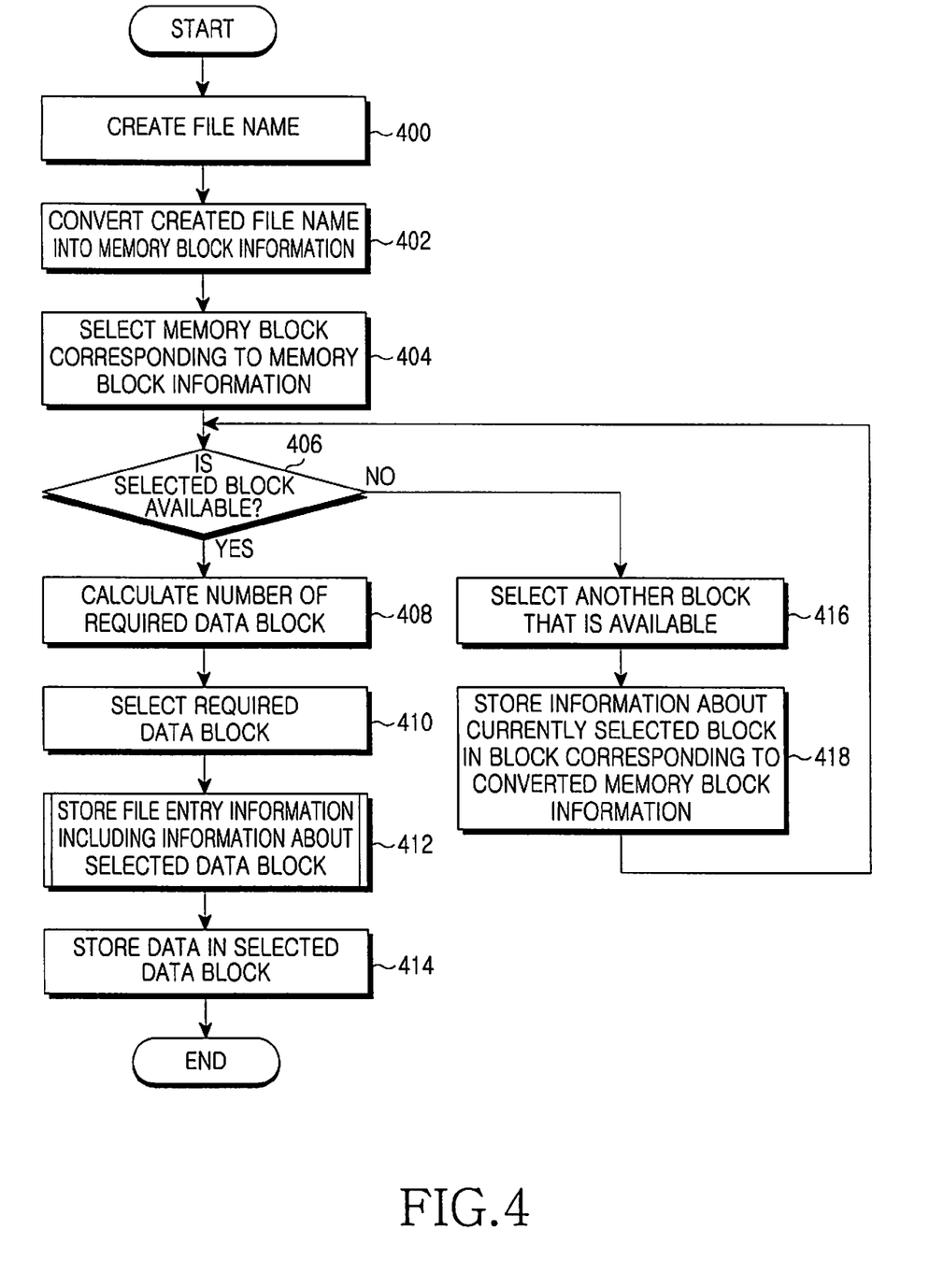
FIG. 4 is a flowchart illustrating a procedure for storing a new file in the file system according to an embodiment of the present invention.

FIG. 4 is a flowchart illustrating a procedure for storing a new file in the file system according to an embodiment of the present invention.

Upon storing a new file, the data management unit 100 of the file system creates a name of the file to be stored in Step 400. In Step 402, the data management unit 100 converts the currently-created file name into memory block information. In Step 404, the data management unit 100 selects a memory block corresponding to the memory block information converted from the file name.

In Step 406, the data management unit 100 checks if the currently-selected memory block is available. In this case, whether a memory block is available may be determined based on if the memory block is empty, or if the memory block supports data overwriting. The determination process of Step 406 is achieved by using bitmap information corresponding to the currently-selected memory block, among bitmap information contained in the bitmap block 114.

When it is determined in Step 406 that the currently-selected memory block is available, the data management unit 100 calculates the number of memory blocks necessary for storing data of the currently-created file in Step 408. Next, the data management unit 100 selects as many available memory blocks as the number of memory blocks calculated in Step 408, as data blocks in Step 410. In addition, the data management unit 100 creates a data block list containing information about the memory blocks currently-selected as the data blocks.

Then, in Step 412, the data management unit 100 stores file entry information including the created data block list in the memory block selected in Step 404. When a file entry block for the currently-created file is created as a result of Step 412, the data management unit 100 proceeds to Step 414, in which the data management unit 100 stores data of the currently-created file in the memory blocks selected as the data blocks in Step 410.

However, when it is determined in Step 406 that the currently-selected memory block is unavailable, that is, when the currently-selected memory block has already been used as a data block, a file entry block or a successive entry block for another file, the data management unit 100 proceeds to Step 416, where the data management unit 100 newly selects another memory block that is currently available. In Step 416, the data management unit 100 can search for a currently available memory block by scanning bitmap information contained in the bitmap block 114. When an available memory block has newly been selected in Step 416, the data management unit 100 proceeds to Step 418, in which the data management unit 100 stores information about the newly-selected memory block in the memory block corresponding to the memory block information converted from the file name in Step 402.

In this case, when the memory block corresponding to the memory block information converted from the file name in Step 402 is a data block, information about the newly-selected memory block is stored in the header area of the data block. In addition, it is recorded in the header of the data block that there exists a file sharing information of the same memory block. However, when the memory block corresponding to the memory block information converted from the file name in Step 402 is a file entry block, information about the newly-selected memory block is stored in the file entry code area 304. Also, when the memory block corresponding to the memory block information converted from the file name in Step 402 is a successive entry block, information about the newly-selected memory block is stored in the successive entry code area 354. Accordingly, a doubly-linked list through a pointer can be created between corresponding two memory blocks.

Then, the data management unit 100 proceeds to Step 408, where the data management unit 100 calculates the number of required data blocks, and then proceeds Steps 410, 412, and 414, where the data management unit 100 selects a required data block, so that the data management unit 100 stores file entry information corresponding to the currently-created file in the memory block newly-selected in Step 416. Accordingly, although there exists mutually different file names sharing the same memory block information, and/or although a memory block corresponding to a currently-created file name is currently in use, a new file can be created and stored. In addition, upon searching for a file, although there exists mutually different file names sharing the same memory block information, and/or although a memory block corresponding to a currently-created file name is currently in use, it is possible to easily find a file entry block of a target file by means of memory block information stored in a memory block corresponding to the name of the target file.

Also, when the file system according to the present invention provides a grouping function as described above, the data management unit 100 reads the file name of a currently-stored file, checks if the read file name includes one or more delimiters, and classifies the name of the currently-stored file according to delimiters when the read file name includes one or more delimiters, so that it is possible to identify a group to which the stored file belongs. It should be clearly understood that the data management unit 100 can automatically perform a grouping operation such that the currently-stored file can belong to the group to which the currently-stored file belongs.

Meanwhile, if the file entry information is too large to be stored in one memory block in Step 412, the data management unit 100 can dividedly store the file entry information by selecting another memory block as a successive entry block, as described above.

Figure 5:
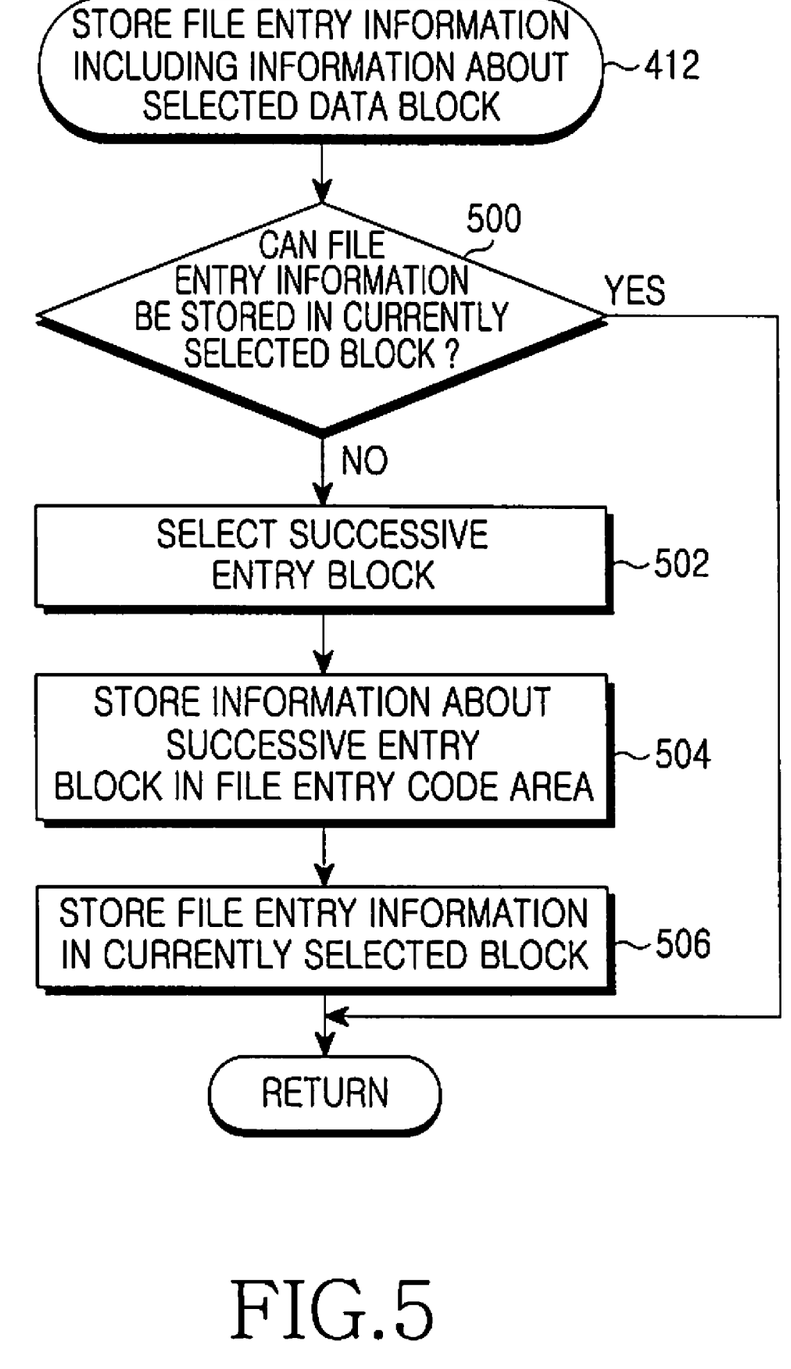
FIG. 5 is a flowchart illustrating the procedure for selecting a successive entry block and storing file entry information in the file system according to an embodiment of the present invention.

FIG. 5 is a flowchart illustrating the procedure for selecting a successive entry block and storing file entry information in the file system according to an embodiment of the present invention.

When a required memory block is selected in Step 410, the data management unit 100 proceeds to Step 500, in which the data management unit 100 checks if file entry information can be stored in the currently-selected memory block. When it is determined in Step 500 that file entry information cannot be stored in the currently-selected memory block, the data management unit 100 proceeds to Step 502, where the data management unit 100 selects a memory block to be used as a successive entry block. Next, the data management unit 100 stores information about the memory block currently-selected as a successive entry block in a file entry code area in Step 504. Thus, the memory block selected in Step 404 or 416 and the memory block selected in Step 502 can be linked to each other by a doubly-linked list through a pointer. Then, the data management unit 100 proceeds to Step 506, where the data management unit 100 stores file entry information in the currently-selected blocks. According to the file system of the present invention, although file entry information is too large to be stored in one memory block, it is possible to store the file entry information by using the successive entry block.

Figure 6:
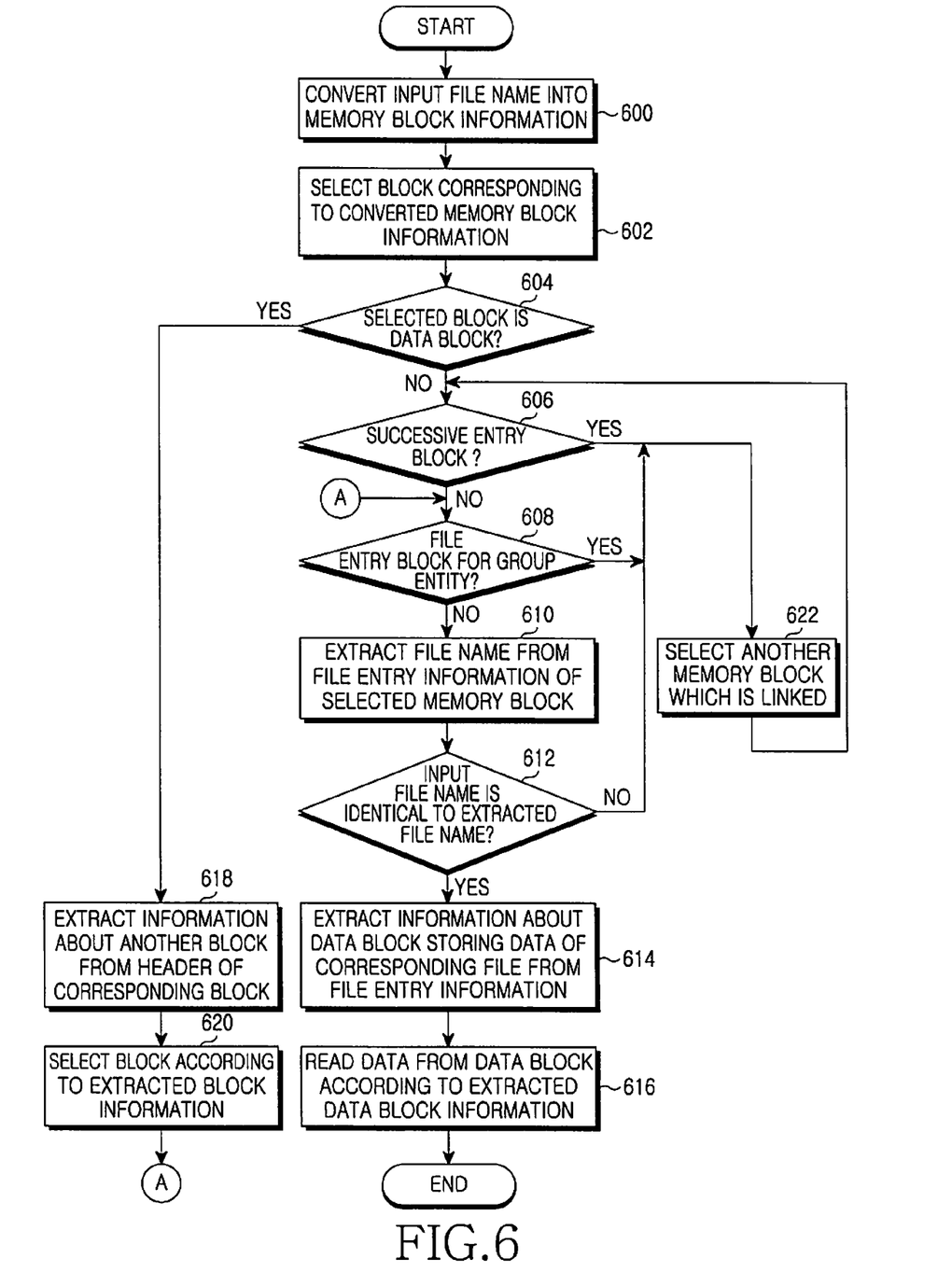
FIG. 6 is a flowchart illustrating a procedure for searching for a specific file in the file system according to an embodiment of the present invention.

FIG. 6 is a flowchart illustrating the procedure for searching for a specific file in the file system according to an embodiment of the present invention.

Upon searching for a file, when a target file is input, the data management unit 100 proceeds to Step 600, where the data management unit 100 converts the input file name into memory block information. Then, the data management unit 100 proceeds to Step 602, in which the data management unit 100 selects a memory block corresponding to the memory block information converted from the target file name.

When the memory block has been selected, the data management unit 100 proceeds to Step 604, in which the data management unit 100 checks if the currently-selected memory block is a data block. When it is determined in Step 604 that the currently-selected memory block is not a data block, the data management unit 100 proceeds to Step 606, in which the data management unit 100 checks if the currently-selected memory block is a successive entry block. When it is determined in Step 606 that the currently-selected memory block is a successive entry block, the data management unit 100 proceeds to Step 622, in which the data management unit 100 selects another memory block linked with the currently-selected memory block through a doubly-linked list. Then, the data management unit 100 again performs Step 606, where the data management unit 100 checks if the currently-selected memory block is a successive entry block.

However, when it is determined in Step 606 that the currently-selected memory block is not a successive entry block, the data management unit 100 proceeds to Step 608, in which the data management unit 100 checks whether the currently-selected memory block is a file entry block including file entry information for a file entity or a file entry block including file entry information for a group entity. This is because if the currently-selected memory block is neither a data block nor a successive entry block, the currently-selected memory block is a file entry block storing file entry information for either a file entity or a group entity. In Step 608, the data management unit 100 can identify whether the currently-selected memory block is either a memory block storing file entry information for a group entity or a memory block storing file entry information for a specific file entity, by a flag stored in a file entry flag area.

When it is determined in Step 608 that the currently-selected memory block is a file entry block including file entry information for a group entity, the data management unit 100 again performs Step 622 in which another memory block linked with the corresponding memory block is selected. Then, the data management unit 100 returns to Step 606 of checking if a currently-selected memory block is a successive entry block.

However, when it is determined in Step 608 that the currently-selected file entry block is a file entry block for a specific file entity, the data management unit 100 proceeds to Step 610, where the data management unit 100 extracts a file name from the currently-selected memory block. Then, the data management unit 100 proceeds to Step 612, in which the data management unit 100 checks if the file name extracted in Step 610 is the same as the input target file name.

When it is determined in Step 612 that the extracted file name is the same as the input target file name, the data management unit 100 determines that it has found the file entry block of the target file and proceeds to Step 614. In Step 614, the data management unit 100 extracts information about data blocks, which has stored data of the target file, from a data block list stored in the currently-selected memory block. Then, the data management unit 100 proceeds to Step 616, in which the data management unit 100 reads data from at least one data block according to the extracted data block information, and outputs the read data as data of the target file.

However, when it is determined in Step 612 that the extracted file name is different from the input target file name, the data management unit 100 again performs Step 622 in which the data management unit 100 selects another memory block linked through the doubly-linked list. Next, the data management unit 100 proceeds to Step 606, where the data management unit 100 checks if the currently-selected memory block is a successive entry block. Then, according to a result of the determination of Step 606, the data management unit 100 either again performs Step 622 or repeats the procedure from Step 608 to Step 616.

Meanwhile, when it is determined in Step 604 that the memory block corresponding to the input target file is a data block, the data management unit 100 proceeds to Step 618, in which the data management unit 100 extracts memory block information of another memory block from the header area of the currently-selected memory block. Next, the data management unit 100 proceeds to Step 620, in which the data management unit 100 selects a memory block corresponding to the memory block information extracted in Step 618. Then, the data management unit 100 proceeds to Step 610, in which the data management unit 100 extracts a file name from the currently-selected memory block, because the memory block selected in Step 620 is a file entry block.

This is because, as described in the new file storing procedure, upon creating a new file, when a memory block corresponding to a created file name has been used as a data block, the data management unit 100 selects a new memory block and stores information about the newly-selected memory block in the header area of the data block corresponding to the created file name. Therefore, a memory block corresponding to the memory block information stored in the header area corresponds to a file entry block storing file entry information so that the memory block contains the file name of a specific file.

Therefore, when the memory block corresponding to the name of the target file is a data block, the data management unit 100 performs Steps 610 and 612 via Steps 618 and 620, thereby comparing a currently-extracted file name with the name of the target file. Then, according to a result of the comparison in Step 612, the data management unit 100 proceeds to either Step 622, where the data management unit 100 selects another memory block linked through a doubly-linked list with a currently-selected memory block, or Steps 614 and 616, where the data management unit 100 reads data of the target file. Therefore, according to the file system of the present invention, information about a data block storing data of a target file can be found from a first memory block corresponding to the name of the target file, or from a second memory block linked with the first memory block, so that it is possible to search for the data of the target file without the conventional directory structure. Accordingly, according to the present invention, it is not required to read a directory file for each directory upon searching for a target file, thereby significantly reducing the time required to search for the target file.

Also, according to the file system of the present invention, each stored file has a unique name, as described above. In addition, as described above, according to the file system of the present invention, a unique name of each file is created by utilizing delimiters used in the directory structure of the conventional file system, and files are grouped based on the unique file names.

Therefore, it should be clearly understood that even a file system having the conventional directory structure can be converted into a file system according to the present invention, by converting the name of each file into a file name which contains a route representing the location of the file and delimiters used to identify each route.

Figure 7:
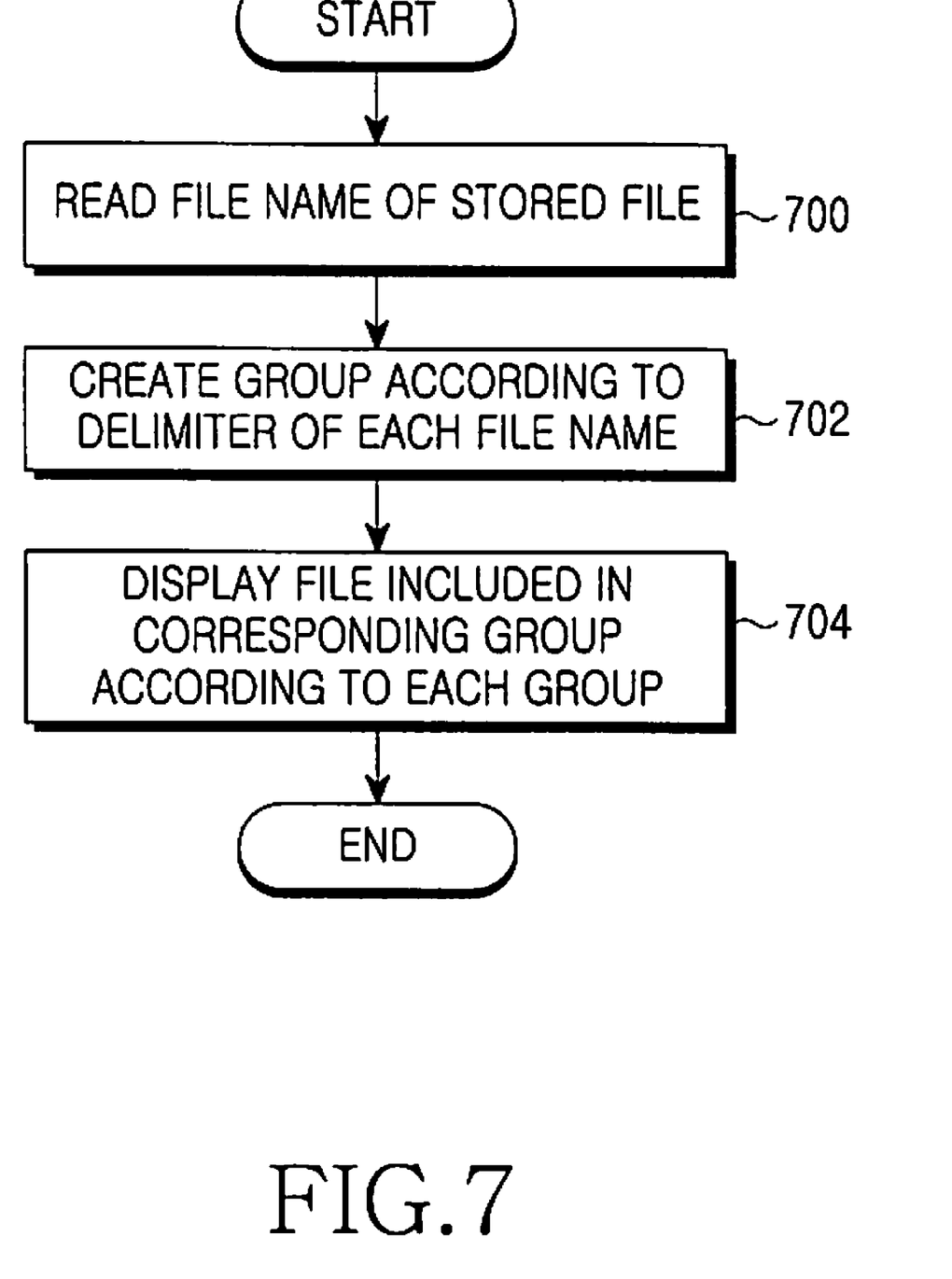
FIG. 7 is a flowchart illustrating a procedure for displaying a file group in the file system according to an embodiment of the present invention.

FIG. 7 is a flowchart illustrating a procedure for grouping files converted to individually have a unique file name in the file system according to an embodiment of the present invention so that the user can easily manage the files in a form similar to the conventional directory structure.

In Step 700, the file system according to the present invention reads file names stored in current file entry blocks in order to group files. Next, in Step 702, the file system creates groups according to each delimiter from each file name. Then, as described above, the files are grouped into the groups created according to each delimiter. In this case, it should be clearly understood that the groups are configured in the form of a tree, similar to that used in the conventional file system. Then, the file system according to the present invention creates a group entity storing index information about the entities of files contained in each group and stores the group entity therein. Thereafter, as requested by the user, the file system according to the present invention proceeds to Step 704, in which the file system displays the structure of files, which have been grouped in a layer form, on a display unit (not shown) by using data of the group entity.

Accordingly, the file system according to present invention can significantly reduce the time required to search for a target file and the time required to search for files corresponding to a specific directory, while enabling the user to use a file system in the same manner as that of the conventional file system. This is because the file system according to the present invention does not have the structure of a directory form, and can directly search for data of a file corresponding to an input or created file name, by using the file name. To this end, the file system according to the present invention give a unique file name to each file, and stores information about a data block containing data of a file in a memory block corresponding to the name of the file. In this case, however, the user may have a difficulty in using the file system, so the present invention provides a grouping function as shown in FIG. 7.

By using such a grouping function, the user can use the file system according to the present invention in a similar manner to that used in a conventional file system having a directory structure. Also, it should be clearly understood that such a grouping function can include functions of adding a new group and changing the name of a created group, as well as a function of displaying the structure of the file system. In this case, for example, just when a new group is added to the file system and then new files belonging to the new group are stored, it can simply be achieved by causing the names of new created files to contain a corresponding group name and one or more corresponding delimiters. However, when it is desired to move files from a conventional group to a new group, or when it is desired to change the name of a conventional group to a new name, it is necessary to change not only data of a file corresponding to a group entity but also the names of files of which a group changes (e.g., a changed group name among the group names contained in a file name). Also, when the name of a specific group changes, it is necessary to change not only the group name contained in the corresponding group entity, but also the names of all files contained in the corresponding group. In these cases, the file system according to the present invention may cause a little delay in changing the file names, so it may be more preferred to use a fixed file system in which a change and/or addition of a group rarely occurs.

As described above, the file system according to the present invention can significantly reduce the time required to search for a file and can efficiently store files.

While the present invention has been described with respect to an example in which each block includes an area of a file entry header, successive entry header or data header, and a function value (e.g., an index value of a hash function) of the conversion unit 104 is stored in each header area, it is possible to separately store the index values in a predetermined area of the storage unit 102 instead of each memory block, and to store a physical address of a corresponding memory block (hereinafter, referred to as a "header block") in the predetermined area. In this case, header information of each memory block according to the exemplary embodiment of the present invention is stored in a separately-created header block, and each header block stores the physical address of a corresponding memory block. According to such a construction, upon searching for a file, the data management unit 100 can acquire the address of a corresponding memory block through the header block without directly accessing a corresponding memory block of the storage unit 102, and can read the entry information of a corresponding file by means of the address information of the acquired memory block. In this case, each memory block does not need to have a separate header area. Accordingly, the scope of the invention is not to be limited by the above embodiments but by the claims and the equivalents thereof.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A file system for searching for a file, the file system comprising:
    a conversion unit for converting a name of a target file into memory block information about a specific memory block;
    a storage unit including a plurality of memory blocks, which contains a memory block corresponding to the memory block information, and at least one memory block storing data corresponding to the target file;
    a data management unit for selecting the memory block corresponding to the memory block information, and when a selected memory block has stored detailed information about the target file and memory block information about the at least one memory block having stored the data corresponding to the target file, reading the data corresponding to the target file from the at least one memory block having stored the data; and
    an output unit for outputting the read data,
    wherein, when the selected memory block has stored detailed information about a specific file and memory block information about at least one memory block having stored data corresponding to the specific file, the data management unit extracts a name of the specific file from the detailed information about the specific file, and compares an extracted file name with the name of the target file, thereby determining if the selected memory block corresponds to a memory block containing information about the target file.

2. The file system as claimed in claim 1, wherein, when the selected memory block has not stored the detailed information about the target file and the memory block information about the at least one memory block having stored the data corresponding to the target file, the data management unit extracts memory block information about another memory block from a header of the selected memory block, and selects a memory block according to extracted memory block information.

3. The file system as claimed in claim 1, wherein the data management unit selects another memory block that is linked with the selected memory block through a doubly-linked list.

4. The file system as claimed in claim 1, wherein the file name is converted into the memory block information by using a hash function.

5. The file system as claimed in claim 1, wherein the memory block information is stored in a header of the specific memory block.

6. The file system as claimed in claim 1, wherein the storage unit includes a bitmap block area that contains information about whether each memory block in the storage unit is available.

* * * * *